(12) United States Patent
Sorensen (10) Patent No.: US 9,210,504 B2
(45) Date of Patent: Dec. 8, 2015

(54) PROCESSING AUDIO SIGNALS (75) Inventor: Karsten Vandborg Sorensen, Stockholm (SE)

(73) Assignee: Skype, Dublin (IE)

(*) Notice: Subject to any disclaimer, the term of this patent is extended or adjusted under 35 U.S.C. 154(b) by 991 days.

(21) Appl. No.: 13/341,607

(22) Filed: Dec. 30, 2011

(65) Prior Publication Data

US 2013/0129100 A1 May 23, 2013

(30) Foreign Application Priority Data

Nov. 18, 2011 (GB) ................................. 1119932.0

(51) Int. Cl.
| | | |
|---|---|---|
| H04R 3/00 | (2006.01) | |
| H04B 3/20 | (2006.01) | |
| H04M 9/08 | (2006.01) | |
| H04R 3/02 | (2006.01) | |
| H04M 3/00 | (2006.01) | |

(52) U.S. Cl.
CPC .................. H04R 3/005 (2013.01); H04R 3/02 (2013.01); *H04M 3/002* (2013.01); *H04M 9/082* (2013.01); *H04R 2430/20* (2013.01)

(58) Field of Classification Search
CPC ....... H04M 9/082; H04M 3/002; H04M 9/08; H04B 3/20; H04R 3/005; H04R 3/02; H04R 2430/20
USPC ...................... 381/66, 92; 379/406.01, 406.06
See application file for complete search history.

(56) References Cited

U.S. PATENT DOCUMENTS

| | | |
|---|---|---|
| 4,849,764 A | 7/1989 | van Heyningen |
| 5,208,864 A | 5/1993 | Kaneda |
| 5,524,059 A | 6/1996 | Zurcher |
| 6,157,403 A | 12/2000 | Nagata |
| 6,232,918 B1 | 5/2001 | Wax et al. |
| 6,339,758 B1 | 1/2002 | Kanazawa et al. |
| 6,914,854 B1 | 7/2005 | Heberley et al. |
| 8,249,862 B1 | 8/2012 | Cheng et al. |

(Continued)

FOREIGN PATENT DOCUMENTS

| | | |
|---|---|---|
| CA | 2413217 | 5/2004 |
| CN | 100446530 | 3/2001 |

(Continued)

OTHER PUBLICATIONS

"Corrected Notice of Allowance", U.S. Appl. No. 13/307,852, Feb. 20, 2015, 2 pages.

(Continued)

*Primary Examiner* — Vivian Chin
*Assistant Examiner* — Douglas Suthers
(74) *Attorney, Agent, or Firm* — Jim Ross; Micky Minhas (57) ABSTRACT

In an embodiment, a method of processing audio signals at a device includes receiving audio signals at a plurality of microphones of the device; processing at least one of the audio signals received by the plurality of microphones to generate a first characteristic; a beamformer applying beamformer coefficients to the received audio signals, thereby generating a beamformer output; processing the beamformer output to generate a second characteristic. An echo canceller is applied to the beamformer output, thereby suppressing, from the beamformer output, an echo resulting from audio signals output from an audio output. An operating parameter of the echo canceller is determined, using a relationship between the first and second characteristics.

21 Claims, 5 Drawing Sheets

(56) References Cited

U.S. PATENT DOCUMENTS

| | | |
|---|---|---|
| 8,325,952 B2 | 12/2012 | Cho |
| 8,620,388 B2 | 12/2013 | Hayakawa et al. |
| 8,824,693 B2 | 9/2014 | Ahgren |
| 8,891,785 B2 | 11/2014 | Sorensen |
| 8,981,994 B2 | 3/2015 | Sorensen |
| 9,031,257 B2 | 5/2015 | Sorensen et al. |
| 9,042,573 B2 | 5/2015 | Sorensen |
| 9,042,574 B2 | 5/2015 | Sorensen |
| 9,042,575 B2 | 5/2015 | Sorensen |
| 9,111,543 B2 | 8/2015 | Ahgren, Per |
| 2002/0015500 A1 | 2/2002 | Belt et al. |
| 2002/0103619 A1 | 8/2002 | Bizjak |
| 2002/0171580 A1 | 11/2002 | Gaus et al. |
| 2004/0125942 A1 | 7/2004 | Beaucoup et al. |
| 2004/0213419 A1 | 10/2004 | Varma et al. |
| 2005/0149339 A1 | 7/2005 | Tanaka et al. |
| 2005/0216258 A1 | 9/2005 | Kobayashi et al. |
| 2005/0232441 A1 | 10/2005 | Beaucoup et al. |
| 2006/0015331 A1 | 1/2006 | Hui et al. |
| 2006/0031067 A1 | 2/2006 | Kaminuma |
| 2006/0133622 A1 | 6/2006 | Chen |
| 2006/0153360 A1 | 7/2006 | Kellermann et al. |
| 2006/0269073 A1 | 11/2006 | Mao |
| 2007/0164902 A1 | 7/2007 | Bang et al. |
| 2008/0039146 A1 | 2/2008 | Jin |
| 2008/0199025 A1 | 8/2008 | Amada |
| 2008/0232607 A1 | 9/2008 | Tashev et al. |
| 2008/0260175 A1 | 10/2008 | Elko |
| 2009/0010453 A1 | 1/2009 | Zurek et al. |
| 2009/0076810 A1 | 3/2009 | Matsuo |
| 2009/0076815 A1 | 3/2009 | Ichikawa et al. |
| 2009/0125305 A1 | 5/2009 | Cho |
| 2009/0274318 A1 | 11/2009 | Ishibashi et al. |
| 2009/0304211 A1 | 12/2009 | Tashev et al. |
| 2010/0014690 A1 | 1/2010 | Wolff et al. |
| 2010/0027810 A1 | 2/2010 | Marton |
| 2010/0070274 A1 | 3/2010 | Cho et al. |
| 2010/0081487 A1 | 4/2010 | Chen et al. |
| 2010/0103776 A1 | 4/2010 | Chan |
| 2010/0128892 A1 | 5/2010 | Chen et al. |
| 2010/0150364 A1 | 6/2010 | Buck et al. |
| 2010/0177908 A1 | 7/2010 | Seltzer et al. |
| 2010/0215184 A1 | 8/2010 | Buck et al. |
| 2010/0217590 A1 | 8/2010 | Nemer et al. |
| 2010/0246844 A1 | 9/2010 | Wolff et al. |
| 2010/0296665 A1 | 11/2010 | Ishikawa et al. |
| 2010/0315905 A1 | 12/2010 | Lee et al. |
| 2010/0323652 A1 | 12/2010 | Visser et al. |
| 2011/0038486 A1 | 2/2011 | Beaucoup |
| 2011/0038489 A1 | 2/2011 | Visser et al. |
| 2011/0054891 A1 | 3/2011 | Vitte et al. |
| 2011/0070926 A1 | 3/2011 | Vitte et al. |
| 2011/0158418 A1 | 6/2011 | Bai et al. |
| 2011/0178798 A1 | 7/2011 | Flaks et al. |
| 2012/0182429 A1 | 7/2012 | Forutanpour et al. |
| 2012/0303363 A1 | 11/2012 | Sorensen |
| 2013/0013303 A1 | 1/2013 | Strommer |
| 2013/0034241 A1 | 2/2013 | Pandey et al. |
| 2013/0082875 A1 | 4/2013 | Sorensen |
| 2013/0083832 A1 | 4/2013 | Sorensen |
| 2013/0083934 A1 | 4/2013 | Åhgren |
| 2013/0083936 A1 | 4/2013 | Sorensen |
| 2013/0083942 A1 | 4/2013 | Åhgren |
| 2013/0083943 A1 | 4/2013 | Sorensen et al. |
| 2013/0136274 A1 | 5/2013 | Åhgren |
| 2013/0148821 A1 | 6/2013 | Sorensen |

FOREIGN PATENT DOCUMENTS

| | | |
|---|---|---|
| CN | 1406066 | 3/2003 |
| CN | 1698395 | 11/2005 |
| CN | 1809105 | 7/2006 |
| CN | 1815918 | 8/2006 |
| CN | 1835416 | 9/2006 |
| CN | 1885848 | 12/2006 |
| CN | 101015001 | 8/2007 |
| CN | 101018245 | 8/2007 |
| CN | 101207663 | 6/2008 |
| CN | 100407594 | 7/2008 |
| CN | 101278596 | 10/2008 |
| CN | 101455093 | 6/2009 |
| CN | 101625871 | 1/2010 |
| CN | 101667426 | 3/2010 |
| CN | 101685638 | 3/2010 |
| CN | 101828410 | 9/2010 |
| CN | 102111697 | 6/2011 |
| CN | 102131136 | 7/2011 |
| CN | 1540903 | 10/2014 |
| DE | 19943872 | 3/2001 |
| EP | 0002222 | 6/1979 |
| EP | 0654915 | 5/1995 |
| EP | 1722545 | 11/2006 |
| EP | 1919251 | 5/2008 |
| EP | 1930880 | 6/2008 |
| EP | 2026329 | 2/2009 |
| EP | 2159791 | 3/2010 |
| EP | 2175446 | 4/2010 |
| EP | 2197219 | 6/2010 |
| EP | 2222091 | 8/2010 |
| EP | 2339574 | 6/2011 |
| JP | 2006109340 | 4/2006 |
| JP | 2006319448 | 11/2006 |
| JP | 2006333069 | 12/2006 |
| JP | 2010232717 | 10/2010 |
| TW | 201123175 | 7/2011 |
| WO | WO-0018099 | 3/2000 |
| WO | WO-03010996 | 2/2003 |
| WO | WO-2007127182 | 11/2007 |
| WO | WO-2008041878 | 4/2008 |
| WO | WO-2008062854 | 5/2008 |
| WO | WO-2010098546 | 9/2010 |
| WO | WO-2012097314 | 7/2012 |

OTHER PUBLICATIONS

"Corrected Notice of Allowance", U.S. Appl. No. 13/308,165, Feb. 17, 2015, 2 pages.

"Corrected Notice of Allowance", U.S. Appl. No. 13/308,210, Feb. 17, 2015, 2 pages.

"Foreign Notice of Allowance", CN Application No. 201210368224. 9, Jan. 6, 2015, 3 pages.

"Foreign Notice of Allowance", CN Application No. 201210377130. 8, Jan. 17, 2015, 3 pages.

"Foreign Notice of Allowance", CN Application No. 201210462710. 7, Jan. 6, 2015, 6 pages.

"Foreign Office Action", CN Application No. 201210377215.6, Jan. 23, 2015, 11 pages.

"Foreign Office Action", CN Application No. 201280043129.X, Dec. 17, 2014, 8 pages.

"Foreign Office Action", EP Application No. 12809381.2, Feb. 9, 2015, 8 pages.

"Foreign Office Action", EP Application No. 12878205.9, Feb. 9, 2015, 6 pages.

"Notice of Allowance", U.S. Appl. No. 13/308,165, Dec. 23, 2014, 7 pages.

"Notice of Allowance", U.S. Appl. No. 13/327,250, Jan. 5, 2015, 9 pages.

"Notice of Allowance", U.S. Appl. No. 13/341,610, Dec. 26, 2014, 8 pages.

"Foreign Office Action", CN Application No. 201210377130.8, Jan. 15, 2014, 12 pages.

"International Search Report and Written Opinion", Application No. PCT/EP2012/059937, Feb. 14, 2014, 9 pages.

"Non-Final Office Action", U.S. Appl. No. 13/327,308, Mar. 28, 2014, 13 pages.

"Notice of Allowance", U.S. Appl. No. 13/307,994, Apr. 1, 2014, 7 pages.

"Corrected Notice of Allowance", U.S. Appl. No. 13/307,994, Jun. 24, 2014, 2 pages.

(56) References Cited

OTHER PUBLICATIONS

"Final Office Action", U.S. Appl. No. 13/212,633, May 23, 2014, 16 pages.
"Final Office Action", U.S. Appl. No. 13/212,688, Jun. 5, 2014, 20 pages.
"Final Office Action", U.S. Appl. No. 13/341,610, Jul. 17, 2014, 7 pages.
"Foreign Office Action", CN Application No. 201210368224.9, Jun. 5, 2014, 11 pages.
"Non-Final Office Action", U.S. Appl. No. 13/307,852, May 16, 2014, 4 pages.
"Non-Final Office Action", U.S. Appl. No. 13/308,165, Jul. 17, 2014, 14 pages.
"Notice of Allowance", U.S. Appl. No. 13/308,106, Jun. 27, 2014, 7 pages.
"Supplemental Notice of Allowance", U.S. Appl. No. 13/307,994, Aug. 8, 2014, 2 pages.
"Foreign Office Action", CN Application No. 201210367888.3, Jul. 15, 2014, 13 pages.
"Foreign Office Action", CN Application No. 201210368101.5, Jun. 20, 2014, 7 pages.
"Foreign Office Action", CN Application No. 201210377215.6, Mar. 24, 2014, 16 pages.
"Foreign Office Action", CN Application No. 201210462710.7, Mar. 5, 2014, 12 pages.
"Non-Final Office Action", U.S. Appl. No. 13/308,210, Aug. 18, 2014, 6 pages.
"Non-Final Office Action", U.S. Appl. No. 13/327,250, Sep. 15, 2014, 10 pages.
"Notice of Allowance", U.S. Appl. No. 13/307,852, Sep. 12, 2014, 4 pages.
"Foreign Office Action", CN Application No. 201210368101.5, Dec. 6, 2013, 9 pages.
"Non-Final Office Action", U.S. Appl. No. 13/307,852, Feb. 20, 2014, 5 pages.
"Non-Final Office Action", U.S. Appl. No. 13/307,994, Dec. 19, 2013, 12 pages.
"Non-Final Office Action", U.S. Appl. No. 13/341,610, Dec. 27, 2013, 10 pages.
"Search Report", GB Application No. 1119932.0, Feb. 28, 2013, 8 pages.
"Search Report", Application No. GB1116846.5, Jan. 28, 2013, 3 pages.
"Search Report", GB Application No. 1116840.8, Jan. 29, 2013, 3 pages.
"Search Report", GB Application No. 1116843.2, Jan. 30, 2013, 3 pages.
"Search Report", GB Application No. 1116869.7, Feb. 7, 2013, 3 pages.
"Search Report", GB Application No. 1121147.1, Feb. 14, 2013, 5 pages.
"UK Search Report", UK Application No. GB1116848.1, Dec. 18, 2012, 3 pages.
"PCT Search Report and Written Opinion", Application No. PCT/US2012/068649, (Mar. 7, 2013), 9 pages.
"PCT Search Report and Written Opinion", Application No. PCT/US2012/058145, (Apr. 24, 2013),18 pages.
"PCT Search Report and Written Opinion", Application No. PCT/US2012/058148, (May 3, 2013), 9 pages.
"PCT Search Report and Written Opinion", Application No. PCT/US2012/058147, (May 8, 2013), 9 pages.
"PCT Search Report and Written Opinion", Application No. PCT/US2012/058143, (Dec. 21, 2012),12 pages.
Goldberg, et al., "Joint Direction-of-Arrival and Array Shape Tracking for Multiple Moving Targets", *IEEE International Conference on Acoustics, Speech, and Signal Processing*, (Apr. 21, 1997), pp. 511-514.

Grbic, Nedelko et al., "Soft Constrained Subband Beamforming for Hands-Free Speech Enhancement", *In Proceedings of ICASSP 2002*, (May 13, 2002), 4 pages.
Handzel, et al., "Biomimetic Sound-Source Localization", *IEEE Sensors Journal, vol. 2, No. 6*, (Dec. 2002), pp. 607-616
Kellerman, W. "Strategies for Combining Acoustic Echo Cancellation and Adaptive Beamforming Microphone Arrays", *In Proceedings of ICASSP 1997*, (Apr. 1997), pp. 219-222.
"International Search Report and Written Opinion", Application No. PCT/US2013/058144, (Sep. 11, 2013),10 pages.
"Non-Final Office Action", U.S. Appl. No. 13/212,633, (Nov. 1, 2013),14 pages.
"Non-Final Office Action", U.S. Appl. No. 13/212,688, (Nov. 7, 2013),14 pages.
Knapp, et al., "The Generalized Correlation Method for Estimation of Time Delay", *IEEE Transactions on Acoustics, Speech, and Signal Processing, vol. ASSP-24, No. 4*, (Aug. 1976), pp. 320-327.
"Search Report", GB Application No. 1108885.3, (Sep. 3, 2012), 3 pages.
"Search Report", GB Application No. 1111474.1, (Oct. 24, 2012), 3 pages.
"Search Report", GB Application No. 1116847.3, (Dec. 20, 2012), 3 pages.
"International Search Report and Written Opinion", Application No. PCT/US2012/058146, (Jan. 21, 2013), 9 pages.
"International Search Report and Written Opinion", Application No. PCT/2012/066485, (Feb. 15, 2013), 12 pages.
"PCT Search Report and Written Opinion", Application No. PCT/US2012/2065737, (Feb. 13, 2013), 12 pages.
"PCT Search Report and Written Opinion", Application No. PCT/US/2012/045556, (Jan. 2, 2013), 10 pages.
"Foreign Office Action", CN Application No. 201210377115.3, Aug. 27, 2014, 18 pages.
"Foreign Office Action", CN Application No. 201210377130.8, Sep. 28, 2014, 7 pages.
"Foreign Office Action", CN Application No. 201210485807.X, Oct. 8, 2014, 10 pages.
"Foreign Office Action", CN Application No. 201210521742.X, Oct. 8, 2014, 16 pages.
"Supplemental Notice of Allowance", U.S. Appl. No. 13/307,852, Oct. 22, 2014, 2 pages.
Goldberg, et al.,' "Joint Direction-of-Arrival and Array-Shape Tracking for Multiple Moving Targets", IEEE International Conference on Acoustic, Speech, and Signal Processing, Apr. 25, 1997, 4 pages.
"Final Office Action", U.S. Appl. No. 13/212,633, May 21, 2015, 16 pages.
"Foreign Office Action", CN Application No. 201210377115.3, Apr. 23, 2015, 12 pages.
"Foreign Office Action", CN Application No. 201210485807.X, Jun. 15, 2015, 7 pages.
"Foreign Office Action", EP Application No. 12784776.2, Jan. 30, 2015, 6 pages.
"Non-Final Office Action", U.S. Appl. No. 13/212,688, Feb. 27, 2015, 23 pages.
"Notice of Allowance", U.S. Appl. No. 13/327,308, Apr. 13, 2015, 6 pages.
"Corrected Notice of Allowance", U.S. Appl. No. 13/307,852, Dec. 18, 2014, 2 pages.
"Final Office Action", U.S. Appl. No. 13/327,308, Dec. 2, 2014, 6 pages.
"Foreign Office Action", GB Application No. 1121147.1, Apr. 25, 2014, 2 pages.
"Non-Final Office Action", U.S. Appl. No. 13/212,633, Nov. 28, 2014, 16 pages.
"Notice of Allowance", U.S. Appl. No. 13/308,210, Dec. 16, 2014, 6 pages.
"Notice of Allowance", U.S. Appl. No. 13/212,688, Sep. 25, 2015, 7 pages.
"Summons to Attend Oral Proceedings", EP Application No. 12878205.9, Jul. 21, 2015, 5 pages.

PROCESSING AUDIO SIGNALS

RELATED APPLICATION

This application claims priority under 35 U.S.C. §119 or 365 to Great Britain Application No. GB 1119932.0, filed Nov. 18, 2011. The entire teachings of the above application are incorporated herein by reference.

TECHNICAL FIELD

The present invention relates to processing audio signals received at a device.

BACKGROUND

A device may have audio input means such as a microphone that can be used to receive audio signals from the surrounding environment. For example, a microphone of a user device may receive a primary audio signal (such as speech from a user) as well as other audio signals. The other audio signals may be interfering audio signals received at the microphone of the device, and may be received from an interfering source or may be ambient background noise or microphone self-noise. The interfering audio signals may disturb the primary audio signals received at the device. The device may use the received audio signals for many different purposes. For example, where the received audio signals are speech signals received from a user, the speech signals may be processed by the device for use in a communication event, e.g. by transmitting the speech signals over a network to another device which may be associated with another user of the communication event. Alternatively, or additionally, the received audio signals could be used for other purposes, as is known in the art.

In order to improve the quality of the received audio signals, (e.g. the speech signals received from a user for use in a call), it is desirable to suppress interfering audio signals (e.g. background noise and interfering audio signals received from interfering audio sources) that are received at the microphone of the user device.

The use of stereo microphones and other microphone arrays in which a plurality of microphones operate as a single audio input means is becoming more common. The use of a plurality of microphones at a device enables the use of extracted spatial information from the received audio signals in addition to information that can be extracted from an audio signal received by a single microphone. When using such devices one approach for suppressing interfering audio signals is to apply a beamformer to the audio signals received by the plurality of microphones. Beamforming is a process of focusing the audio signals received by a microphone array by applying signal processing to enhance particular audio signals received at the microphone array from one or more desired locations (i.e. directions and distances) compared to the rest of the audio signals received at the microphone array. For simplicity we will describe the case with only a single desired direction herein, but the same method will apply when there are more directions of interest. The angle (and/or the distance) from which the desired audio signal is received at the microphone array, so-called Direction of Arrival ("DOA") information, can be determined or set prior to the beamforming process. It can be advantageous to set the desired direction of arrival to be fixed since the estimation of the direction of arrival may be complex. However, in alternative situations it can be advantageous to adapt the desired direction of arrival to changing conditions, and so it may be advantageous to perform the estimation of the desired direction of arrival in real-time as the beamformer is used. Adaptive beamformers apply a number of weights (or "beamformer coefficients") to the received audio signals.

These weights can be adapted to take into account the DOA information to process the audio signals received by the plurality of microphones to form a "beam" whereby a high gain is applied to desired audio signals received by the microphones from a desired location (i.e. a desired direction and distance) and a low gain is applied in the directions to any other (e.g. interfering) signal sources. The beamformer may also be "adaptive" in the sense that the suppression of interfering sources can be adapted, the selection of the desired source/look direction may not necessarily be adaptable.

As well as having a plurality of microphones for receiving audio signals, a device may also have audio output means (e.g. comprising a loudspeaker) for outputting audio signals. Such a device is useful, for example where audio signals are to be outputted to, and received from, a user of the device, for example during a communication event. For example, the device may be a user device such as a telephone, computer or television and may include equipment necessary to allow the user to engage in teleconferencing.

Where a device includes both audio output means (e.g. including a loudspeaker) and audio input means (e.g. microphones) then there is often a problem when an echo is present in the received audio signals, wherein the echo results from audio signals being output from the loudspeaker and received at the microphones. An echo canceller may be used to cancel the echo in the audio signals received at the microphones. Echo suppression and echo subtraction are two methods of implementing an echo canceller. For example, an echo canceller may implement an echo suppressor which is used to suppress the echo in the audio signals received at the microphones. The path of propagation of an audio signal from the loudspeaker to the microphone is known as the echo path, and an echo suppressor may estimate the echo path gain as a function of time and frequency and use this to estimate the echo power in the received audio signals. The estimate of the echo power in the received audio signals can be used to suppress the echo in the received audio signals to a level such that they are not noticeable. The estimation of the echo power in the received audio signals is based on a model of the loudspeaker-enclosure-microphone system in which the echo canceller is operating. The model is often, at least partly, linear, but in some cases the model may be non-linear. A hybrid echo canceller consists of an echo subtractor and an echo suppressor applied in a cascaded manner. By using a hybrid echo canceller, increased doubletalk transparency is achieved by the echo subtractor, and if needed an additional echo suppression gain is achieved by the echo suppressor.

Common requirements for optimum operation of the echo cancellation are that:
  The echo path is relatively slowly varying since otherwise the echo path gain estimate would rapidly be inaccurate;
  The system is sufficiently linear to be modelled by a linear echo model; and
  The echo path gain should not be underestimated, since underestimation would in turn also cause the echo power to be underestimated. This would cause the echo canceller to apply too little suppression and thereby pass through residual echoes that are non-negligible.

It is not a trivial task to implement both a beamformer and an echo canceller on received audio signals. Indeed, when incorporating an adaptive microphone beamformer (e.g. in a teleconferencing application) care needs to be taken so that the echo canceller performance is not reduced by the adaptive behavior of the beamformer.

In a first system implementing beamforming and echo cancellation together, a separate echo canceller is applied for each microphone signal before the beamforming is performed. However, this first system is very computationally complex due the operation of multiple echo cancellers for the multiple microphone signals. Furthermore, the use of echo cancellers on the microphone signals may disturb the beamforming process of the beamformer.

In a second system implementing beamforming and echo cancellation together, an echo canceller is applied to the output of the beamformer. In this second system the behavior of the data-adaptive beamformer is preferably constrained to be changing very slowly over time, since otherwise the estimates of the echo path used in the echo canceller will be detrimentally affected as the echo canceller attempts to adjust the echo path estimates in response to the changes in the beamformer behavior. Furthermore in this second system the beamformer is preferably constrained to be linear and slowly varying in order to prevent a detrimental reduction in the achievable echo cancellation performance. Some beamformers are linear, but some are not linear, so the choice of beamformers is restricted (to being a linear beamformer) in the second system.

Therefore, there are problems with both the first system and the second system described above.

Furthermore, when applying beamformers in combination with an acoustic echo canceller (AEC), the last applied one needs to take the other into account for achieving the best performance. When internal information from the beamformer is available, there are ways to do a deep integration where one module essentially does both AEC and beamforming.

When no internal information is available, on the other hand, it becomes harder to accurately compensate in the AEC for the echo attenuation done by the beamformer.

SUMMARY

Embodiments of the present invention allow for a microphone beamformer to be used together with an echo canceller and provide accurate compensation for the beamformer without needing internal access to it.

According to a first aspect of the invention there is provided a method of processing audio signals at a device, the device comprising an audio output for outputting audio signals, the method comprising:
  receiving audio signals at a plurality of microphones of the device;
  processing at least one of the audio signals received by the plurality of microphones to generate a first characteristic;
  a beamformer applying beamformer coefficients to the received audio signals, thereby generating a beamformer output;
  processing the beamformer output to generate a second characteristic;
  applying an echo canceller to the beamformer output, thereby suppressing, from the beamformer output, an echo resulting from audio signals output from the audio output;
  determining an operating parameter of the echo canceller, using a relationship between the first and second characteristics.

The first and second characteristics can be determined in frequency bands such that their relationship represents a beamformer gain spectrum.

In some of the described embodiments, an echo path is estimated based on the at least one audio input signal and the audio signals output from the audio output, and the operating parameter is determined using the estimated echo path and the beamformer gain spectrum.

In other embodiments, the invention can also be used to compensate the echo path adaptation. The above mentioned identified gains by which the beamformer has changed the spectra (as determined by the ratio) can be used to scale a copy of the beamformer output signal by dividing of the analyzed spectral coefficients with the gain the beamformer applies in that domain. In other words, it would approximately recreate the echo as it appeared in the input signal. Thus, it is possible to adapt the echo path of the echo canceller on an artificial signal that has been generated from the beamformer output signal and the beamformer gain spectrum. When the echo is estimated, the beamformer gain spectrum is used to produce an estimate of the echo in the beamformer output and thus the operating parameter.

The method may comprise a step of determining which of the received audio signals has the strongest echo.

The signal with the strongest echo may be the "strongest" audio signal, i.e. the one of the received audio signals that has the highest average power over time, but it may be another one of the signals.

Using the signal with the strongest echo would ensure that the identified echo suppression gain spectrum will be between 0 and 1.

It is not strictly necessary to use the signal with the strongest echo, as the identified beamformer gain could be higher than 1.

The operating parameter may comprise a level of echo suppression which is applied by the echo canceller (e.g. by echo suppression of the echo canceller) to the beamformer output.

The method used in preferred embodiments to integrate a beamformer and AEC is to use the same spectral analysis as done by the suppression based AEC on both the chosen input signal and the output of the beamformer. In this context "integrate" means to adaptively cooperate the beamformer and the AEC. In some embodiments this involves converting both frequency spectra to power spectra having coefficients in different frequency bands (bins). Once the spectral analysis and preparation is the same as done by the suppression based AEC, the relationship between the characteristics is determined in each band as the ratio between the input characteristic and output characteristic in that band. These ratios accurately describe for each band the best possible compensation for the beamforming to be implemented in the suppression based AEC when the echo path has been adapted from the audio output signal and the chosen input signal. When there is no echo, the gains can be ignored as they are not describing ratios of an echo. When the echo canceller reduces the echo reduction gain to suppress echo, this gain is divided by the ratio between output and input of the beamformer. That is, if the beamformer output during echo in one bin is half the power of the input, the echo reducing gain is divided by a half. Thus the combination of gains end up exactly at what the echo canceller would have applied without the beamformer applied.

According to a second aspect of the invention there is provided a device for processing audio signals, the device comprising: an audio output for outputting audio signals; a plurality of microphones for receiving audio signals; a beamformer configured to apply beamformer coefficients to the received audio signals, to thereby generate a beamformer output; an echo canceller configured to be applied to the beamformer output, to thereby suppress, from the beamformer output, an echo resulting from audio signals output from the audio output; and a processor configured to generate a first characteristic of at least one of the audio signals received by the plurality of microphones, generate a second characteristic of the beamformer output and determine an operating parameter of the echo canceller using a relationship between the first and second characteristics.

The echo canceller may comprise echo suppression arranged to be applied to the beamformer output.

According to a third aspect of the invention there is provided a computer program product for processing audio signals at a device, the device comprising a plurality of microphones for receiving audio signals and an audio output for outputting audio signals, the computer program product being embodied on a non-transient computer-readable medium and configured so as when executed on a processor of the device to perform the steps of the above defined method.

BRIEF DESCRIPTION OF THE DRAWINGS

For a better understanding of the present invention and to show how the same may be put into effect, reference will now be made, by way of example, to the following drawings in which.

DETAILED DESCRIPTION

Preferred embodiments of the invention will now be described by way of example only. It may be desirable to implement both a beamformer and an echo canceller at a device, for example, for use with a teleconferencing application. In the following embodiments of the invention, techniques are described which allow a beamformer to be used together with an echo canceller without restricting the beamformer type or beamformer behavior and without affecting the performance of the echo canceller, even when no internal access is available to the beamformer.

This means that even without internal access to the beamformer, the design of the beamformer can be changed, without updating the AEC integration. It also allows cooperation with third party beamformers.

A beamformer can be modeled as follows. The purpose of a microphone beamformer is to combine several microphone signals in order to produce a beamformer output. The beamformer output may consist of many signals, but for simplicity, in the preferred embodiments described below it will be assumed that the beamformer produces one single output. There are many different beamforming algorithms which may be used and a common model to describe the beamforming algorithms is $$y(t)=f(y_1(t),y_2(t),\ldots,y_N(t)),$$

where y(t) is the beamformer output, $y_n(t)$ is the nth input signal from the nth microphone in a microphone array, N is the total number of beamformer input signals and f( ) is the beamformer function. The beamformer function f( ) may take one of many different forms and may be linear or non-linear. For a Delay-and-sum beamformer the beamforming algorithm is given by:

$$y(t) = \frac{1}{N}\sum_{n=1}^{N} y_n(t).$$

For an MVDR beamformer the beamforming algorithm is given by:

$$y(t)=\Sigma_{n=1}^{N}(\Sigma_0^{M-1}g_n(m)y_n(t-m)),$$

where $g_n(t)$ is a weighting factor for the nth input signal and M is the length of the MVDR filters at each delay.

An echo canceller which operates to cancel echo in a single microphone input signal y(t) can be modeled as follows. The echo path is the path of propagation for a loudspeaker signal x(t) to the microphone signal y(t). An echo canceller using echo suppression may operate by estimating the echo path gain $|H(t, f)|^2$ for time t and frequency f, and using the estimate $|\hat{H}(t, f)|^2$ of the echo path gain to estimate the echo power $|S(t, f)|^2$ in the received audio signal. This estimation of the echo power may be performed based on a linear model of the loudspeaker-enclosure-microphone system on which the echo canceller is operating, according to the equations:

$$Y(t,f)=S(t,f)+N(t,f)=H(t,f)X(t,f)+N(t,f)$$

$$S(t,f)=H(t,f)X(t,f)$$

where Y(t, f) is the short-time Fourier transform (STFT) coefficient of the microphone signal, X(t, f) is the STFT coefficient for the loudspeaker signal, S(t, f) is STFT coefficient for the echo signal, H(t, f) is the transfer function of the echo path, and N(t, f) is the STFT coefficient of all near-end sound, microphone noise and modelling errors (that is all the received audio signals other than the echo). The STFT coefficients for the loudspeaker signal X(t, f) is known because the device will know what signal is being output from its loudspeaker. Therefore, in order to determine the echo power $|S(t, f)|^2$ the transfer function of the echo path H(t, f) should be estimated.

The echo path gain estimate $|\hat{H}(t, f)|^2$ may be estimated from the model as a function of Y(t, f) and X(t, f) under the assumption that X(t, f) is uncorrelated with N(t, f). Furthermore, the estimation speed, or confidence in the estimates, may be adjusted based on the expected echo to near-end ratio, which limits the possible accuracy of the estimation, i.e., the estimate is mainly updated when the echo power is expected to be strong in the microphone signal. One estimation method which may be used is the least squares estimation method.

The echo path gain estimate $|\hat{H}(t, f)|^2$ is used to estimate the echo power $|\hat{S}(t, f)|^2$ using the model above, that is:

$$|\hat{S}(t,f)|^2=|\hat{H}(t,f)|^2|X(t,f)|^2.$$

Common requirements for optimum operation of the echo cancellation are that:
 The echo path is relatively slowly varying since otherwise the echo path gain estimate would rapidly be inaccurate.
 The system is sufficiently linear to be modelled by the linear echo model above.

The echo path gain should not be underestimated, i.e., $|\hat{H}(t, f)|^2 \geq |H(t,f)|^2$, since underestimation would in turn also cause the echo power $|\hat{S}(t, f)|^2$ to be underestimated. This would cause the echo canceller to apply too little suppression and thereby pass through residual echoes that are non-negligible.

Figure 1:
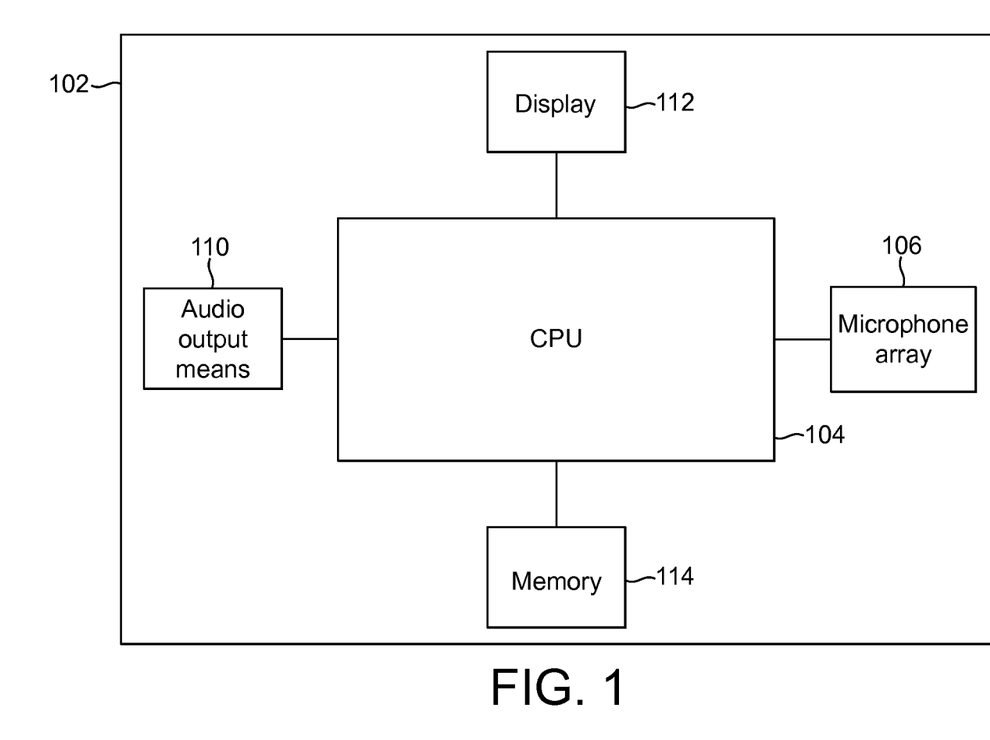
FIG. 1 shows a schematic view of a device according to a preferred embodiment.

Reference is now made to FIG. 1 which illustrates a schematic view of a device 102. The device 102 may be a fixed or a mobile device. The device 102 comprises a CPU 104, to which is connected a microphone array 106 for receiving audio signals, audio output means 110 for outputting audio signals, a display 112 such as a screen for outputting visual data to a user of the device 102 and a memory 114 for storing data.

Figure 2:
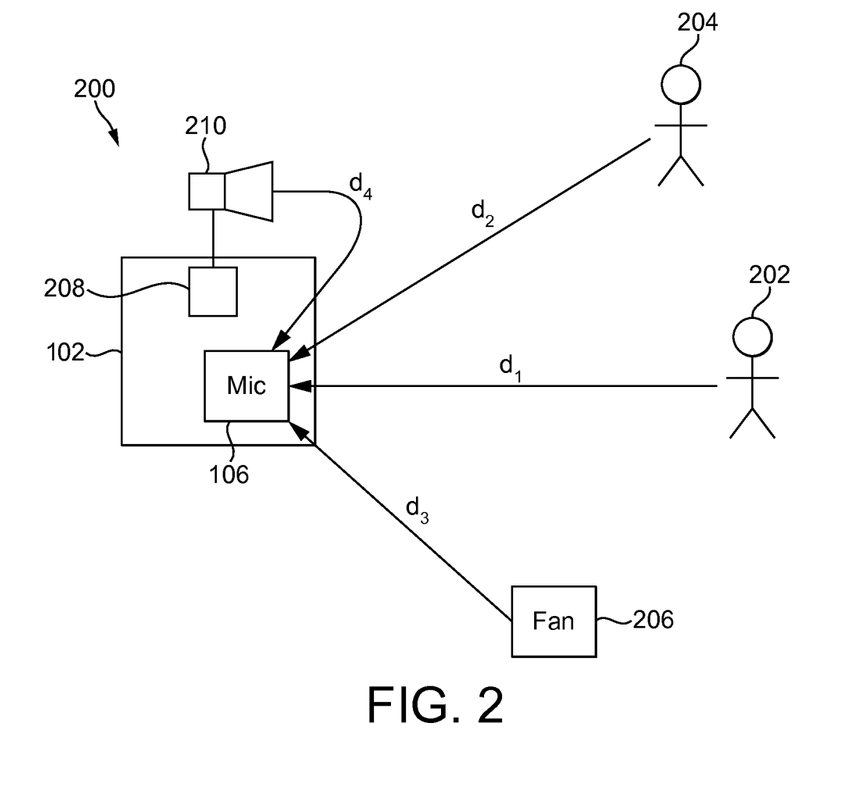
FIG. 2 shows a system according to a preferred embodiment.

Reference is now made to FIG. 2, which illustrates an example environment 200 in which the device 102 operates.

The microphone array 106 of the device 102 receives audio signals from the environment 200. For example, as shown in FIG. 2, the microphone array 106 receives audio signals from a user 202 (as denoted $d_1$ in FIG. 2), audio signals from another user 204 (as denoted $d_2$ in FIG. 2), audio signals from a fan 206 (as denoted $d_3$ in FIG. 2) and audio signals from a loudspeaker 210 (as denoted $d_4$ in FIG. 2). The audio output means 110 of the device 102 comprise audio output processing means 208 and the loudspeaker 210. The audio output processing means 208 operates to send audio output signals to the loudspeaker 210 for output from the loudspeaker 210. The audio output processing means 208 may operate as software executed on the CPU 104, or as hardware in the device 102. It will be apparent to a person skilled in the art that the microphone array 106 may receive other audio signals than those shown in FIG. 2. In the scenario shown in FIG. 2 the audio signals from the user 202 are the desired audio signals, and all the other audio signals which are received at the microphone array 106 are interfering audio signals. In other embodiments more than one of the audio signals received at the microphone array 106 may be considered "desired" audio signals, but for simplicity, in the embodiments described herein there is only one desired audio signal (that being the audio signal from user 202) and the other audio signals are considered to be interference. Other sources of unwanted noise signals may include for example air-conditioning systems, a device playing music and reverberance of audio signals, e.g. off a wall in the environment 200.

Figure 3:
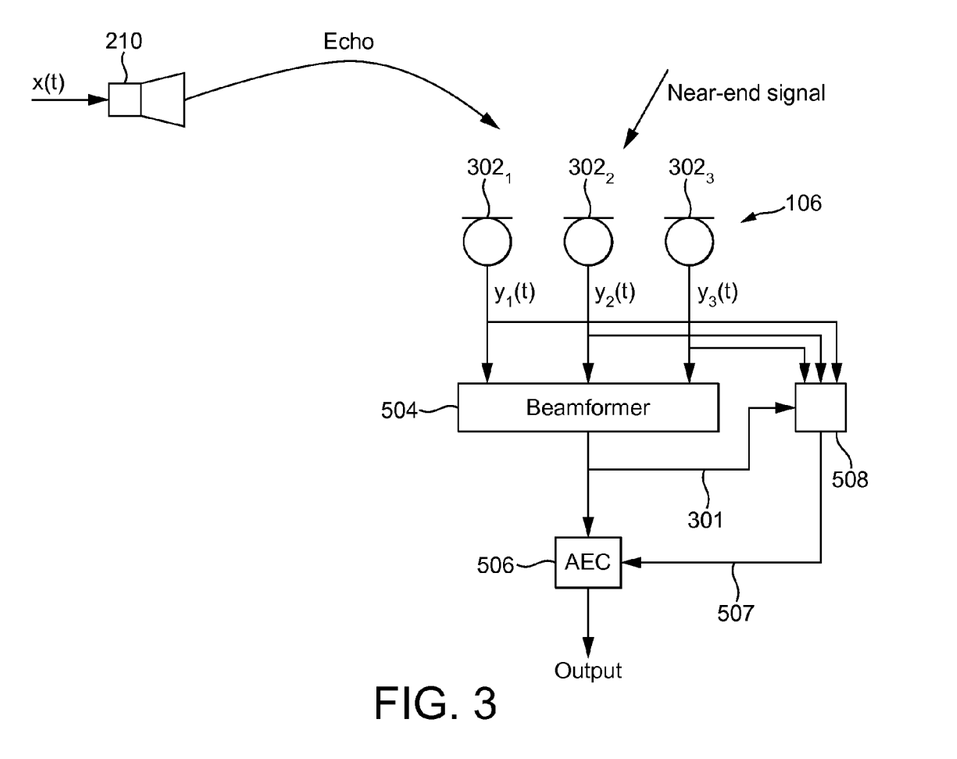
FIG. 3 shows a functional block diagram of elements of a device according to a preferred embodiment.

Reference is now made to FIG. 3 which illustrates a functional representation of elements of the device 102 according to a preferred embodiment of the invention. The microphone array 106 comprises a plurality of microphones $302_1$, $302_2$ and $302_3$. The device 102 further comprises a beamformer 504, an acoustic echo canceller 506 and a processing block 508. The beamformer 504 may for example be a Minimum Variance Distortionless Response (MVDR) beamformer. The beamformer 504, echo canceller 506 and processing block 508 may be implemented in software executed on the CPU 104 or implemented in hardware in the device 102. The output of each microphone in the microphone array 106 is coupled to a respective input of the beamformer 504. The output of each microphone in the microphone array 106 is also coupled to a respective input of the processing block 508. An output of the beamformer 504 is coupled to an input of the echo canceller 506 and to the processing block 508. An output of the processing block 508 is coupled to an input of the echo canceller 506 to thereby provide side information 507 to the echo canceller 506. Persons skilled in the art will appreciate that multiple inputs are needed in order to implement beamforming. The microphone array 106 is shown in FIG. 3 as having three microphones ($302_1$, $302_2$ and $302_3$), but it will be understood that this number of microphones is merely an example and is not limiting in any way.

The beamformer 504 includes means for receiving and processing the audio signals $y_1(t)$, $y_2(t)$ and $y_3(t)$ from the microphones $302_1$, $302_2$ and $302_3$ of the microphone array 106. For example, the beamformer 504 may comprise a voice activity detector (VAD) and a DOA estimation block (not shown in the Figures). In operation the beamformer 504 ascertains the nature of the audio signals received by the microphone array 106 and based on detection of speech like qualities detected by the VAD and the DOA estimation block, one or more principal direction(s) of the main speaker(s) is determined. In other embodiments the principal direction(s) of the main speaker(s) may be pre-set such that the beamformer 304 focuses on fixed directions. In the example shown in FIG. 2 the direction of audio signals ($d_1$) received from the user 202 is determined to be the principal direction. The beamformer 504 may use the DOA information (or may simply use the fixed look direction which is pre-set for use by the beamformer 304) to process the audio signals by forming a beam that has a high gain in the direction from the principal direction ($d_1$) from which wanted signals are received at the microphone array 106 and a low gain in the directions to any other signals (e.g. $d_2$, $d_3$ and $d_4$).

The beamformer 504 can also determine the interfering directions of arrival ($d_2$, $d_3$ and $d_4$), and advantageously the behavior of the beamformer 504 can be adapted such that particularly low gains are applied to audio signals received from those interfering directions of arrival in order to suppress the interfering audio signals. Whilst it has been described above that the beamformer 504 can determine any number of principal directions, the number of principal directions determined affects the properties of the beamformer, e.g. for a large number of principal directions the beamformer 504 will apply less attenuation of the signals received at the microphone array from the other (unwanted) directions than if only a single principal direction is determined. The output of the beamformer 504 is provided to the echo canceller 506 in the form of a single channel to be processed. It is also possible to output more than one channel, for example to preserve or to virtually generate a stereo image. The output of the echo canceller 506 may be used in many different ways in the device 102 as will be apparent to a person skilled in the art. For example, the output of the echo canceller 506 could be used as part of a communication event in which the user 202 is participating using the device 102.

Figure 4:
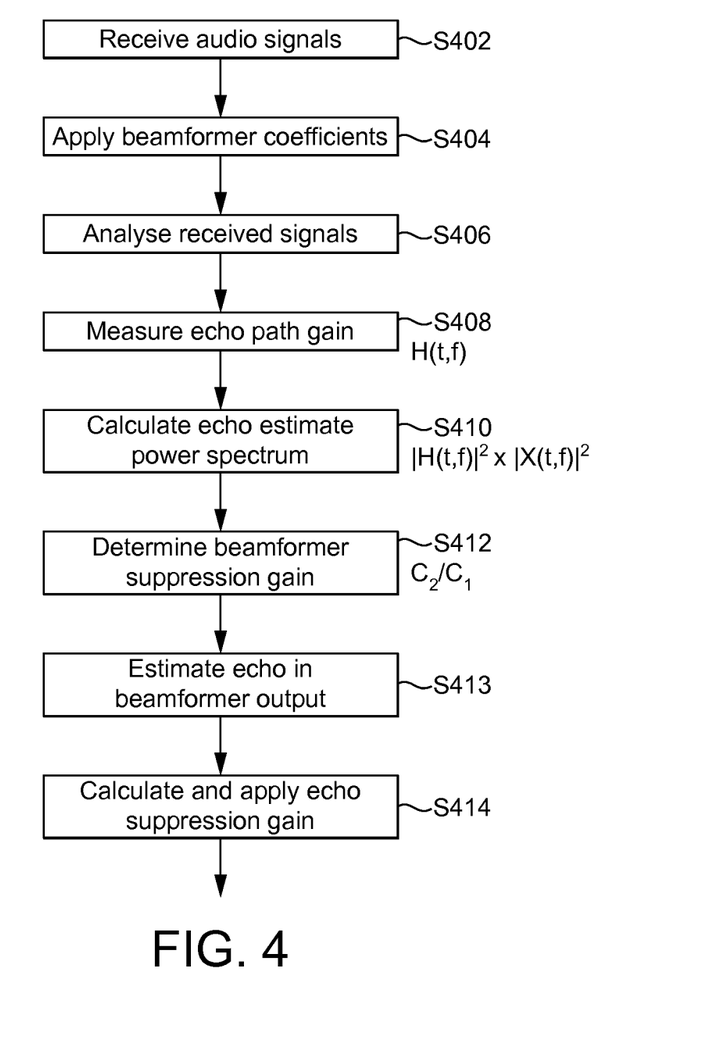
FIG. 4 is a flow chart for a process of processing audio signals according to a preferred embodiment.

With reference to FIG. 4 there is now described a method of processing audio signals according to a preferred embodiment. In step S402 audio signals are received at the microphones ($302_1$, $302_2$ and $302_3$) of the microphone array 106. The audio signals are received, for example, from the user 202, the user 204 and the fan 206, and these audio signals constitute the near-end audio signals as shown in FIG. 2 and FIG. 3. The microphones in the microphone array 106 also receive an echo signal from the loudspeaker 210 as shown in FIG. 2 and FIG. 3. Other interfering audio signals, such as background noise, may also be received at the microphones ($302_1$, $302_2$ and $302_3$) of the microphone array 106, and these other interfering audio signals will constitute further near-end audio signals. The audio signals $y_1(t)$, $y_2(t)$ and $y_3(t)$ received by each microphone ($302_1$, $302_2$ and $302_3$) of the microphone array 106 are passed to the beamformer 504 and to the processing block 508. The echo signal is the result of the audio output processing means 208 sending the loudspeaker audio signal x(t) to the loudspeaker 210 and the loudspeaker outputting the loudspeaker audio signal x(t). The loudspeaker audio signal x(t) propagates through the echo path (described by H(t, f)) and is present in the received audio signals $y_1(t)$, $y_2(t)$ and $y_3(t)$.

In step S404 the beamformer 504 applies its beamformer filter coefficients to the received audio signals ($y_1(t)$, $y_2(t)$ and $y_3(t)$) to thereby generate a beamformer output 301. As described above the beamformer 504 focuses on audio signals received at the microphone array 106 from the principal direction ($d_1$) to thereby enhance the desired audio signals received from the user 202, and to apply suppression to other audio signals received at the microphone array 106 from other directions. The beamformer 504 should have a fixed gain for audio signals received from the principal location (i.e. direction and distance), wherein the beamformer gain should preferably be constant over time (but possibly not constant over frequency) to thereby prevent distortion of the desired audio signals. As an example, the beamformer gain may be set to a value of 1 for the principal location (i.e. principal direction and/or distance). The task of the beamformer 504 is to enhance the signals from the principal source relative to other disturbing sources. The beamformer output is passed to the echo canceller 506.

In step S406 the processing block 508 analyses the received audio signals $y_1(t)$, $y_2(t)$ and $y_3(t)$ to determine which signal to supply for processing in the AEC. This can be any input signal, and may be the strongest input signal.

In step S408 the echo path gain $|H_{max}(t, f)|^2$, of the received audio signal is estimated. This involves finding an estimate of the echo path gain $|\hat{H}_{max}(t, f)|^2$ according to the equation:

$$Y_{max}(t,f) = H_{max}(t,f) X(t,f) + N_{max}(t,f),$$

where, as described above, it is assumed that X(t, f) is uncorrelated with N(t, f) in the estimation.

In one embodiment, in step 410, an estimate of the echo power spectrum is calculated based on the echo path gain determined in step S408, by multiplying the echo path gain by loudspeaker signal power.

The echo power is estimated by multiplying the echo path gain of the received audio signal $|\hat{H}(t, f)|^2$ measured in step S608 with the loudspeaker signal power $|X(t, f)|^2$ which is output from the loudspeaker 210, that is:

$$|\tilde{S}(t,f)|^2 = |\hat{H}_{max}(t,f)|^2 |X(t,f)|^2.$$

Figure 5A:
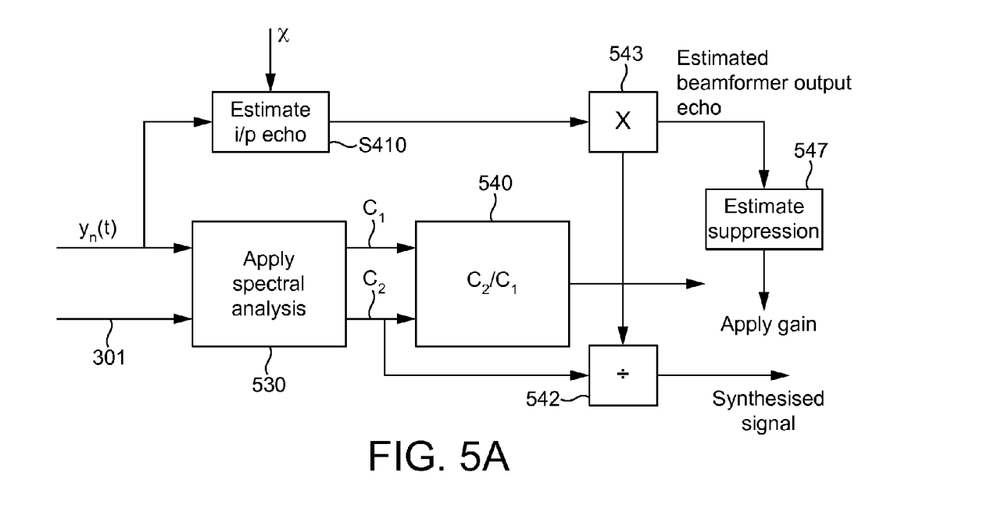
FIG. 5A is a functional block diagram of one embodiment.

In step S412, a beamformer suppression gain is determined, as described more fully with respect to FIG. 5A.

In step S413, an estimate of the echo in the beamformer output is determined by multiplying the echo estimate from step S410 with the determined beamformer suppression gain from step S412.

In step S414, using the above estimate, the echo suppression gains are calculated and applied to the beamformer output. The level of echo suppression in step S414 is determined based on the estimated echo power of the estimated echo in the beamformer output, and this takes into account the determined beamformer suppression gain.

The level of echo suppression to be applied by the echo canceller 506 is determined based on an estimate of the echo power in the estimated echo in the beamformer output.

Steps S410 and S412 may be performed by the processing block 508 with the results being passed to the echo canceller 506 as side information. Alternatively, one or both of steps S410 and S412 may be performed by the echo canceller 506 itself based on side information of the received audio signal which is received at the echo canceller 506 from the processing block 508.

In an alternative embodiment (FIG. 5B), the step S413 of estimating echo in the beamformer output is not carried out. Instead, a step S413' is carried out of estimating echo suppression based on the estimate of echo power in the received audio signals ($|\tilde{S}(t, f)|^2$), and then modified.

By updating the echo path based on a received input signal, and determining the beamformer echo suppression, based on an estimated echo in the output of the beamformer, the problem of estimating the echo path is solved, as the beamformer does not affect the echo path as seen by the AEC when updating the echo path model. Using a synthesized version of the echo has a similar effect.

Embodiments of the invention compensate any suppression based AEC for the time- and frequency varying echo reduction done by a beamformer. That is, the above determined suppression gain is based on determined beamformer gain spectrum. Although particularly effective when used with the above way of determining suppression gain, the present invention can be applied with other methods of determining suppression gain.

In step S414 the echo canceller 506 is applied to the beamformer output 301, wherein the level of suppression applied by the echo canceller 506 is calculated as above. The signal is output from the echo canceller 506 for further processing in the device 102. For example the signal output from the echo canceller 506 may be used in a communication event, for example for transmission to another device over a network as a speech signal from the user 202 to another user as part of an audio or video call.

FIG. 5A is a functional block diagram showing how the gain is determined. FIG. 5A illustrates a processing block 530 which applies a spectral analysis to the input y(t) with the strongest echo and the beamformer output 301 to generate respective first and second characteristics, each of which are a function of frequency. The model we use for the Short Time Fourier Transform (STFT) of the received signal in frame n is:

$$Y n(t,f) = H n(t,f) * X n(t,f) + N n(t,f),$$

where H n (t, f) is the STFT of the impulse response of the room, including speaker and microphone. X n(t, f) is the STFT of what is played out through the speaker (the far end signal). N n(t, f) is the STFT of everything else than echo that is received by the microphone, that is, near end speech, and background noise.

The spectral analysis we use in the AEC is the STFT, calculated using the Fast Fourier Transform (FFT). After the transform, we calculate the power spectrum and operate on this spectrum.

In the above example the processing block carries out a Fourier transform to generate the Fourier spectrum, which can be converted into a power spectrum. Ratio determination block 540 determines the ratio $C_2/C_1$ for each frequency band, with $C_1$ being the spectrum describing the input signal ($y_n(t)$, and $C_2$ being the spectrum describing the beamformer output signal 301, and supplies it to the AEC as side information for determining the suppression gain. The ratio $C_2/C_1$ represents the effective gain of the beamformer in each frequency band. The ratio is multiplied by the estimated echo on the input at block 543 to obtain an estimate of the echo in the beamformer output. This is used to generate an estimate of AEC suppression gain (block 547).

In addition, the ratio can be used to provide a synthesized signal which simulates the beamformer input including the echo. This is done by scaling a copy of the beamformer output by dividing the analyzed spectral coefficient $C_2$ for each frequency band with the ratio $C_2/C_1$ in that frequency band in divide function 542 to recreate the echo as it appeared in the input signal. The echo can be supplied to the AEC as side information. Alternatively the divide scaling function 542 can be implemented in the AEC.

This allows the AEC to adapt its suppression gains in the synthesized signal. The synthesized signal has an echo of a similar spectral shape as what was in the beamformer input signal.

The processing which is carried out is the same as that carried out in the AEC to determine the suppression gain. It will thus be appreciated that this function could be implemented in the AEC itself.

The echo canceller 506 of the preferred embodiment is applied on the beamformer output. The beamforming process will affect the echo signal in the audio signal received at the echo canceller 506, and therefore the echo canceller gain is determined based on an estimate of the beamformer spectrum gain. In addition, the echo path model can be refined based on additional input from the spectral analysis of the received signals.

Figure 5B:
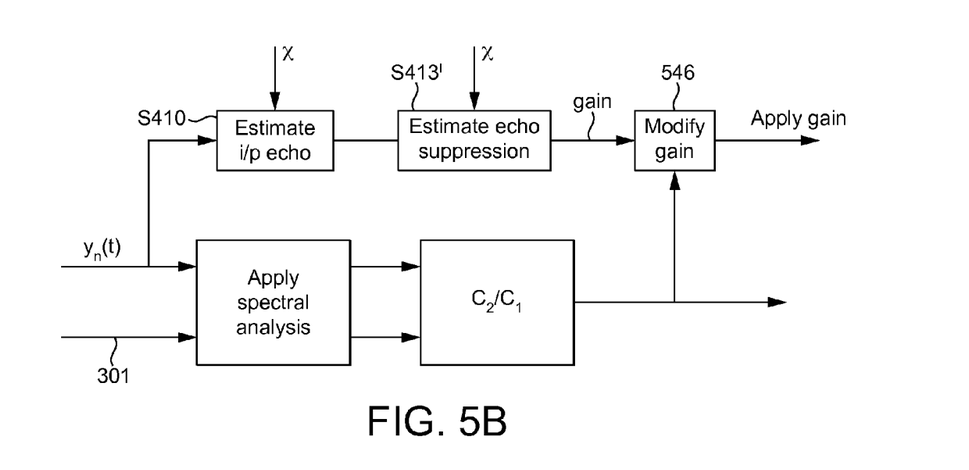
FIG. 5B is a functional block diagram of another embodiment.

An alternative embodiment is illustrated in FIG. 5B. According to this embodiment, after step S408 of estimating the echo path gain, the level of echo suppression to be applied by the echo canceller 506 is determined based on an estimate of the echo power in the received audio signals. The echo power is estimated by multiplying the echo path gain of the strongest audio signal $|\hat{H}_{max}(t, f)|^2$ with the loud speaker signal power $|S(t, f)|^2$ which is output from the loudspeaker 210, that is:

$$|\hat{S}(t,f)|^2 = |\hat{H}(t,f)|^2 |X(t,f)|^2.$$

In this way, the echo power is updated based on the echo path gain of the selected one of the received audio signals. The determined beamformer gain spectra is then used to modify the determined echo suppression, and the modified gain is then applied at the echo canceller, as shown in block S413' and block 546 of FIG. 5B.

Embodiments of the present invention can be applied in any scenario where the beamformer output is applied to the echo canceller. When estimating the echo power on the basis of the echo path gain of the strongest of the received audio signals as described above. It has the following advantages:

1. From the basic assumptions and requirements behind standard echo cancellation, $Y_{max}(t, f)$ and $X(t, f)$ are preferably linearly related regardless of the type of the beamformer (because $Y_{max}(t, f)$ relates to the audio signal prior to the beamforming process) and thus this relation can be well approximated by $|\hat{H}_{max}(t, f)|^2$ using a linear estimation method. Therefore the estimate of the echo power $|\hat{S}(t, f)|^2$ can be validly determined using the linear model described above even if the beamformer 504 does not use a linear function $f(\ )$. This relaxes the constraints on the beamformer 504 such that the beamforming function $f(\ )$ may be linear or nonlinear. It is noted that echo cancellers may include non-linear models to deal with nonlinearities in the echo path. However, introducing further nonlinearities in the echo path, some of which may not be easily modeled, will have an impact on the near-end transparency of the echo canceller.

2. The time-variations of $|\hat{H}_{max}(t, f)|^2$ should be the same as for the standard echo cancellation case, regardless of the beamformer behaviour. This is because the estimate of the echo path gain of the strongest received audio signal $|\hat{H}_{max}(t, f)|^2$ is determined prior to the beamforming process. This relaxes the constraints on the beamformer 504 such that the beamformer output may vary slowly or quickly in time without adversely affecting the estimation of the echo power $|\hat{S}(t, f)|^2$ for use by the echo canceller 506.

In summary, in preferred embodiments of the present invention, the behavior of the echo canceller 506 is based on one of a plurality of received audio signals ($Y_{max}(t, f)$) prior to application of a beamformer to the received audio signals, whilst the echo canceller 506 is applied to an output of the beamformer 504. Moreover, the echo that is estimated by the echo canceller 506 can be modified by determining the effective gain of the beamformer and compensating for it.

In the example embodiments described above the microphone array 106 is a 1-D array of microphones ($302_1$, $302_2$ and $302_3$) which allows the beamformer 504 to distinguish between audio signals received with different angles in one dimension (e.g. along a horizontal axis). In alternative embodiments, the microphone array 106 may be a 2-D or a 3-D array of microphones which would allow the beamformer 504 to distinguish between audio signals received with different angles in two or three dimensions respectively (e.g. along horizontal, vertical and depth axes). Furthermore, in the preferred embodiments the microphone array 106 is a uniform array of microphones 302. However, in alternative embodiments the microphone array 106 may be a non-uniform array of microphones 302.

As described above, the beamformer 504, the echo canceller 506 and the processing block 508 may be implemented in software executed on the CPU 104 or implemented in hardware in the device 102. When the beamformer 504, the echo canceller 506 and the processing block 508 are implemented in software, they may be provided by way of a computer program product embodied on a non-transient computer-readable medium which is configured so as when executed on the CPU 104 of the device 102 to perform the function of the beamformer 504, the echo canceller 506 and the processing block 508 as described above. The method steps S404 to S414 may be performed by functional blocks of the beamformer 504, the echo canceller 506 and the processing block 508 (as software or hardware blocks).

Whilst the embodiments described above have referred to a microphone array 106 receiving one desired audio signal ($d_1$) from a single user 202, it will be understood that the microphone array 106 may receive audio signals from a plurality of users, for example in a conference call which may all be treated as desired audio signals. In this scenario multiple sources of wanted audio signals arrive at the microphone array 106.

The device 102 may be a television or a computer or any other suitable device for implementing the invention. Furthermore, the beamformer 504, the echo canceller 506 and the processing block 508 may be enabled for any suitable equipment using stereo microphone pickup. The methods described above may be enabled as a part of a Voice Quality Enhancement (VQE) module within a device, and run on any suitable platform.

In the embodiments described above, the loudspeaker 210 is a monophonic loudspeaker for outputting monophonic audio signals and the beamformer output from the beamformer 504 is a single signal. However, this is only in order to simplify the presentation and the invention is not limited to be used only for such systems. In other words, some embodiments of the invention may use stereophonic loudspeakers for outputting stereophonic audio signals, and some embodiments of the invention may use beamformers which output multiple signals.

The invention is particularly useful for application to echo cancellers based on echo suppression since it requires only one echo canceller to be used (such as echo canceller 506 described above), and since the beamformer integration into the echo canceller is then reasonably simple. For Hybrid echo cancellers which use both subtraction-based echo cancellation (which may be linear or nonlinear) and echo suppression the situation is a bit different. The echo subtraction part of a hybrid echo canceller may need to be applied to each of the beamformer microphone input signals. The echo suppression part of the echo canceller would in that case still be performed after the beamformer when hybrid echo cancellation is implemented according to the invention.

Although in the embodiments described above the processing block 508 is shown as being separate to the beamformer 504 and the echo canceller 506, in some embodiments some or all of the functionality of the processing block 508 may be implemented within the beamformer 504 and/or the echo canceller 506.

While this invention has been particularly shown and described with reference to preferred embodiments, it will be understood to those skilled in the art that various changes in form and detail may be made without departing from the scope of the invention as defined by the appendant claims.

What is claimed is:

1. A method of processing audio signals at a device, the device comprising an audio output for outputting audio signals, the method comprising:
   receiving audio signals at a plurality of microphones of the device;
   processing at least one of the audio signals received by the plurality of microphones to generate a first characteristic;
   a beamformer applying beamformer coefficients to the received audio signals, thereby generating a beamformer output;
   processing the beamformer output to generate a second characteristic;
   applying an echo canceller to the beamformer output, thereby suppressing, from the beamformer output, an echo resulting from audio signals output from the audio output; and
   determining an operating parameter of the echo canceller based, at least in part, on a relationship between the first and second characteristics.

2. The method of claim 1 wherein each characteristic comprises a power spectrum, and the relationship defines a beamformer gain spectrum.

3. The method of claim 1 wherein each characteristic has a coefficient in each of a plurality of frequency bands, the relationship being determined for each frequency band.

4. The method of claim 1 wherein the relationship is a ratio of the first characteristic to the second characteristic.

5. The method of claim 1, comprising adapting an estimate of an echo path from the audio output to the plurality of microphones, prior to applying the echo canceller.

6. The method of claim 5, wherein adapting the estimate is carried out on the received audio signals.

7. The method of claim 5, wherein a beamformer gain spectrum based, at least in part, on the relationship, is applied to the output of the beamformer to generate a synthesized signal, wherein adapting the estimate is carried out on the synthesized signal.

8. The method of claim 5, wherein adapting the estimate comprises generating an echo path estimate using the audio signals supplied to the audio output.

9. The method of claim 1, further comprising:
   estimating an echo path gain based, at least in part, on at least one of the audio signals received by the plurality of microphones;
   estimating an echo in the beamformer output based, at least in part, on the estimated echo path gain and the relationship between the first and said characteristics; and
   using the estimated echo in the beamformer output to determine said operating parameter.

10. The method of claim 1, comprising:
    measuring an echo path gain based, at least in part, on at least one of the audio signals received by the plurality of microphones; and
    using said measured echo path gain to determine an estimate of the echo power in the beamformer output, wherein said operating parameter is determined based on the estimate of the echo power in the beamformer output, and then modified based on said relationship between the first and second characteristics.

11. The method of claim 5 wherein a beamformer gain spectrum based, at least in part, on the relationship, is applied to the output of the beamformer to generate a synthesized signal, wherein the operating parameter is controlled based on the synthesized signal.

12. The method of claim 1 wherein said operating parameter comprises a level of echo suppression which is applied by the echo canceller to the beamformer output.

13. The method of claim 1 further comprising adapting said beamformer coefficients of the beamformer based on an analysis of the received audio signals.

14. A device for processing audio signals, the device comprising:
    an audio output for outputting audio signals;
    a plurality of microphones for receiving audio signals;
    a beamformer configured to apply beamformer coefficients to the received audio signals, to thereby generate a beamformer output;
    an echo canceller configured to be applied to the beamformer output, to thereby suppress, from the beamformer output, an echo resulting from audio signals output from the audio output; and
    a processor configured to:
      generate a first characteristic of at least one audio signal received by the plurality of microphones;
      generate a second characteristic of the beamformer output; and
      determine an operating parameter of the echo canceller based, at least in part, on a relationship between the first and second characteristics.

15. The device of claim 14 wherein said echo canceller comprises echo suppression arranged to be applied to the beamformer output, the echo suppression comprising a spectral analysis function.

16. The device of claim 15 wherein the processor operates to apply the spectral analysis function for generating the first and second characteristics.

17. The device of claim 16 wherein the processor comprises a ratio function for providing the relationship.

18. The device of claim 15 wherein the processor comprises a divide function for applying the relationship to the output of the beamformer for generating a synthesized signal.

19. A device of claim 14, wherein said processor is further configured to enable the device to:
    estimate an echo path gain from at least one audio signal received by the plurality of microphones;
    estimate an echo in the beamformer output based, at least in part, on the estimated echo path gain and the relationship between the first and second characteristics; and
    determine said operating parameter based on the estimate of the echo power in the beamformer output.

20. The device of claim 14, wherein said processor is further configured to enable the device to:
- measure an echo path gain from the at least one of the audio signals received by the plurality of microphones;
- use said measured echo path gain to determine an estimate of the echo power in the beamformer output, wherein said operating parameter is determined based on the estimate of the echo power in the beamformer output; and
- modify the thus determined operating parameter based on said relationship between the first and second characteristics.

21. A computer program product for processing audio signals at a device, the device comprising a plurality of microphones for receiving audio signals and an audio output for outputting audio signals, the computer program product being embodied on one or more computer-readable hardware memory devices and configured so as, responsive to execution by at least one processor of the device, to enable the device to perform operations comprising:

- receiving audio signals at a plurality of microphones of the device;
- processing at least one of the audio signals received by the plurality of microphones to generate a first characteristic;
- a beamformer applying beamformer coefficients to the received audio signals, thereby generating a beamformer output;
- processing the beamformer output to generate a second characteristic;
- applying an echo canceller to the beamformer output, thereby suppressing, from the beamformer output, an echo resulting from audio signals output from the audio output; and
- determining an operating parameter of the echo canceller based on a relationship between the first and second characteristics.

* * * * *